United States Patent
Hisafumi

(10) Patent No.: US 6,429,558 B1
(45) Date of Patent: Aug. 6, 2002

(54) SMALL-SIZED CORELESS MOTOR

(75) Inventor: Yasuda Hisafumi, Adachi-ku (JP)

(73) Assignee: Namiki Seimitsu Houseki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/806,015
(22) PCT Filed: Sep. 24, 1998
(86) PCT No.: PCT/JP98/04277
  § 371 (c)(1),
  (2), (4) Date: Jul. 16, 2001
(87) PCT Pub. No.: WO00/17988
  PCT Pub. Date: Mar. 30, 2000

(51) Int. Cl.$^7$ ................................. H02K 7/06
(52) U.S. Cl. .................. 310/81; 310/40 MM
(58) Field of Search ........................ 310/81, 40 MM, 310/261, 154, 233, 244

(56) References Cited

U.S. PATENT DOCUMENTS

| | | | |
|---|---|---|---|
| 5,107,155 A | * 4/1992 | Yamaguchi | 310/81 |
| 5,327,035 A | * 7/1994 | Sunaga | 310/81 |
| 5,341,057 A | * 8/1994 | Yamaguchi et al. | 310/81 |
| 5,373,207 A | * 12/1994 | Yamaguchi et al. | 310/81 |
| 5,621,260 A | * 4/1997 | Fukuoka et al. | 310/154 |
| 5,889,349 A | * 3/1999 | Yasuda | 310/261 |

FOREIGN PATENT DOCUMENTS

| | | |
|---|---|---|
| JP | 52-100101 A | 8/1977 |
| JP | 53-27411 U | 3/1978 |
| JP | 54-122304 U | 8/1979 |
| JP | 57-21277 U | 2/1982 |
| JP | 57-65582 U | 4/1982 |
| JP | 57-189279 U | 12/1982 |
| JP | 6-284662 A | 10/1994 |
| JP | 7-284243 A | 10/1995 |
| JP | 9-37510 A | 2/1997 |

OTHER PUBLICATIONS

International Search Report dated Dec. 22, 1998.

* cited by examiner

Primary Examiner—Tran Nguyen
Assistant Examiner—Thanh Lam
(74) Attorney, Agent, or Firm—Eric J. Robinson; Robinson Intellectual Property Law Office, PC

(57) ABSTRACT

The motor as a whole is made smaller and lighter with a fixed shaft (10) as the main part, with this fixed shaft (10) inserted through and fixed to the center of a field magnet (11a) such that the field magnet (11a) placed roughly in the middle of the center axis of the fixed shaft (10) makes up the stator (11). The outer periphery of this field magnet (11a) is encompassed by the inner diameter of a cylindrical coil (12a), separated by a gap (G). Rotor plates (12b, 12c) are fitted so as to be free to rotate around the central axis of the fixed shaft (10) on both sides of the field magnet (11a), and these rotor plates (12b, 12c) are fitted into the ends of the coil (12a) and with it make up the rotor (12). A cylindrical yoke (13) is placed around the outer periphery of the coil (12a) and forms a single unit with it, and eccentric plates (14) around the outer periphery of the yoke make up the eccentric weight.

7 Claims, 5 Drawing Sheets

SMALL-SIZED CORELESS MOTOR

FIELD OF TECHNOLOGY

This invention deals with a coreless, miniature motor. In more detail, it deals with improvement of a miniature motor for use in assembly of pagers, mobile telephones and other portable electronic equipment, to serve as a vibration alarm device that rings by vibration.

PRIOR TECHNOLOGY

Vibration alarm devices that ring by vibration instead of ringing by sound have been adopted as alarm devices to notify one of received messages in conferences and other locations where production of a sound is to be avoided.

Conventionally, vibration alarm devices of this sort have used coreless motors that rotate an eccentric weight.

Such a coreless motor has, as shown in FIG. 9, an external housing 1 that comprises a cylindrical case 1a and caps 1b and 1c that fit into both ends of the case 1a, a central rotating shaft 2 of which one end projects through the cap 1b at one end of the case 1a and the other end is located within the case 1a; the rotating shaft 2 is supported and free to turn within a bearing 3 in the cap 1b, and an eccentric weight 4, a stator 5 and a rotor 6 are assembled on the same axis as the rotating shaft 2.

Of these, the eccentric weight 4 is fixed on the end of the rotating shaft 2 that protrudes from the external housing 1 beyond the cap 1b. The stator 5 is fixed between a bearing 5a, which is on the same axis as the rotating shaft 2 and located towards its other (enclosed) end, and a ring 1d inside from the cap 1b through which the rotating shaft 2 is inserted; the stator 5 is an assembly of field magnets in the form of a hollow cylinder with the rotating shaft 2 as its central axis. The rotor 6 has a cylindrical coil 6a located, with intervening spaces, between the field magnets 5b and the case 1a of the external housing 1. The coil 6a is assembled so as to turn together with the rotating shaft 2, by means of support by a support plate 6b that is between the bearing 5a of the field magnets 5b and the other (enclosed) end of the rotating shaft 2.

In addition, there is a commutator 7 on the same axis between the support plate 6b of the coil 6a and the other (enclosed) end of the rotating shaft 2, as well as a brush mount (not illustrated) on the cap 1c for the brush 8, and a lead wire 9 that connects the brush 8 to a battery or other power source.

The eccentric weight 4 mounted on the axis that protrudes outside the external housing 1 of this coreless motor presents a major obstacle to efforts to make portable electronic equipment such as pagers and mobile telephones smaller and lighter. The external housing 1 is essential to the structure of the coreless motor described above, and in addition to the size of the external housing, a case must be formed between it and the coil 6a, so the external housing 1 is another obstacle to efforts to reduce size and weight. Moreover, because the eccentric weight 4 spins about with support on one side, the load of the spinning is particularly heavy on the bearing 3, and a loss of torque occurs. Moreover, if the equipment undergoes a fall or shock, the heaviness of the weight 4 can bend the rotating shaft 2; it is not possible to make the shaft 2 with a very small diameter.

In addition to the eccentric weight and the external housing discussed above, there are other problems with the structure of the brushes of the conventional coreless motor. A round wire or ribbon wire that is straight or bent in a U-shape with the base welded to a brush holder is generally used as the brush. Two brushes are mounted so as to press like springs, from both sides, against the commutator 7 that is mounted on the same axis as the rotating shaft 2. Because of the overall length and the mounting, a large assembly space is required. Moreover, if the outer diameter of the commutator 7 is reduced along with that of the rotating shaft 2, it becomes difficult to adjust the pressure accurately and the length of the springs is no longer adequate, so this is not desirable as a brush for use with a miniature coreless motor.

The same sort of problems are manifest in the structure of a gyro motor. For this reason there is a desire for coreless miniature motors, including gyro motors, that meet the conditions of small size, light weight, excellent shock resistance, and good precision. There are limits, however, to motors that rotate with eccentric weights.

PRESENTATION OF INVENTION

The purpose of this invention is to provide a coreless miniature motor, including vibrating coreless motors and gyro motors, with superior portability in terms of small size and light weight, that can function as a weight or flywheel that produces rotary vibration without relying on rotation of an eccentric weight supported on one side by a rotating shaft.

An additional purpose of this invention is to provide a coreless miniature motor that can be built without an external housing, and which costs less, is easily assembled and well-suited to mass production.

Moreover, it is a purpose of this invention to focus on the structure of brush attachment, and to provide a coreless miniature motor with small, high-performance brushes that have a fully effective length even when used with commutators of small diameter.

One more purpose is to provide a coreless miniature motor with superior shock resistance, and other features of this invention will become clear through the following detailed explanation.

OPTIMUM MODE FOR IMPLEMENTATION OF INVENTION

Figure 1:
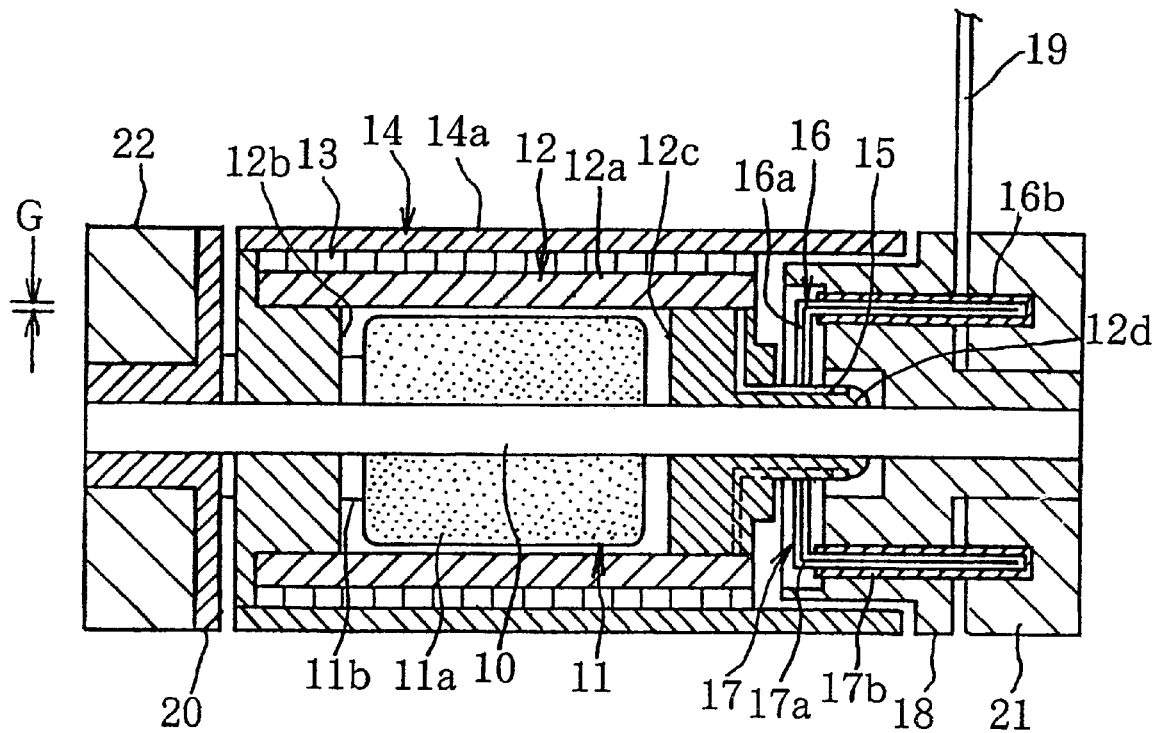
FIG. 1 is a side section showing the internal structure of the coreless miniature motor of this invention.

This invention is explained in detail below, with reference to FIGS. 1 to 8. This invention constitutes a coreless miniature motor, or coreless motor or gyro rotor, used to generate vibrations. In place of the conventional motor assembled with a rotating shaft and a rotor that includes a coil, the coreless miniature motor has, as shown in FIG. 1, a main part which is a fixed shaft 10 held in place on both ends by brackets attached as described below, assembled with a stator 11, a rotor 12 and other parts, and with the rotor 12 also serving as an eccentric weight.

With the fixed shaft 10 as the main part, the stator 11 has the fixed shaft 10 inserted in a central position; the field magnet 11a is fitted onto the shaft roughly at its center, with its position along the axis determined by a spacer 11b.

The rotor 12 comprises a cylindrical coil 12a that contains within its inner diameter the field magnet 11a separated by a slight gap G, and rotor plates 12b, 12c that are free to turn on the axis of the fixed shaft 10 with the field magnet 11 between them. The rotor plates 12b, 12c are fitted into the inner diameter of the coil 12a at its open ends; the coil 12a is supported by the rotor plates, so that the assembly is free to turn on the fixed shaft 10.

The coil 12a is assembled with a cylindrical yoke 13 around its outside. The yoke 13 is formed as a helical wrapping of magnetic wire, and layered with the coil 12a to form a single unit. Because the yoke 13 is formed as a unit with the coil 12a, the gap surrounding the field magnet 11 can be made more narrow, and it is possible to prevent the generation of eddy currents; this makes it possible to increase the rotational torque.

Figure 2:
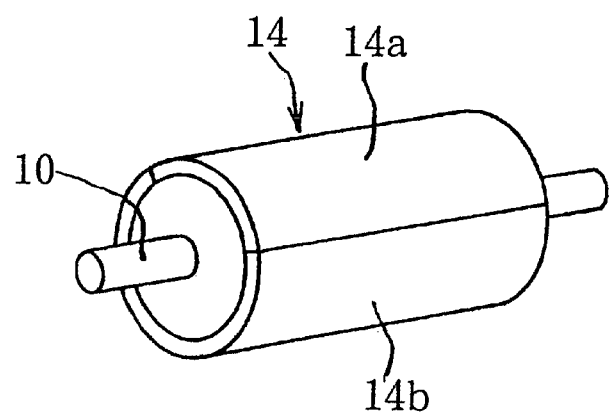
FIG. 2 is an oblique view showing a key part of the coreless miniature motor of this invention.

In addition, the outside of the yoke 13 is plated with an eccentric plate 14. This eccentric plate 14 is, as shown in FIG. 2, a pipe shape divided into two parts, of which one is made of a heavy material such as tungsten, and the other is made of a light material like aluminum; this makes up the rotor 12, as well as the eccentric weight.

Because the eccentric plate 14 is the outermost layer, it increases the efficiency of the momentum of the force turning it as an eccentric weight. And because the outer periphery of the yoke 13 can be applied as the thrust length, it is possible to generate a great vibration force with a motor that is small in diameter, short in length and light in weight. And because the eccentric plate 14 can serve as the outer case, as described below, and is formed into a single unit with the yoke 13 and the coil 12a, the number of parts can be reduced, and it is possible to assemble easily a small, light motor.

Of the rotor plates 12b, 12c described above, the rotor plate 12c has a commutator 15 attached to it. The commutator 15 is made of a conductive metallic material, and is anchored in the resin-molded rotor plate 12c as a part of cylindrical portion 12d that extends along the hole in the rotor plate 12c through which the fixed shaft 10 passes. Because this commutator 15 is part of a single unit with the rotor plate 12c, it is possible to further reduce the number of parts in the motor and facilitate assembly.

Figure 3:
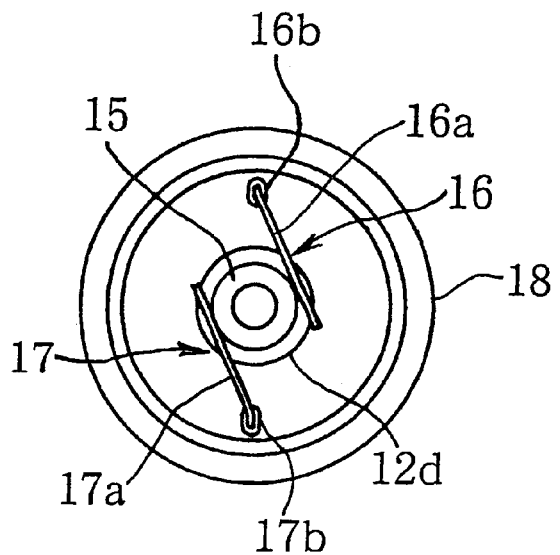
FIG. 3 is a cross section of the coreless miniature motor of this invention taken at line A—A of FIG. 1.

As shown in FIG. 3, the spring portions of a pair of brushes 16, 17 are pressed against the outer periphery of the commutator 15 from opposite sides. Each of the brushes 16, 17 is held in a brush mount 18 at one end of the fixed shaft 10.

Figure 4:
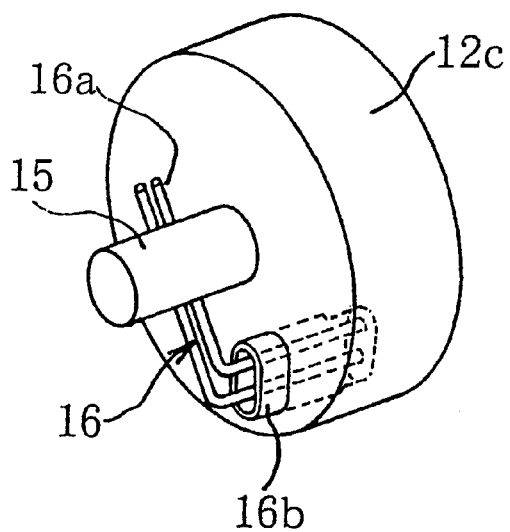
FIG. 4 is an explanatory drawing showing one example of the brushes used in the coreless miniature motor of this invention.
Figure 5:
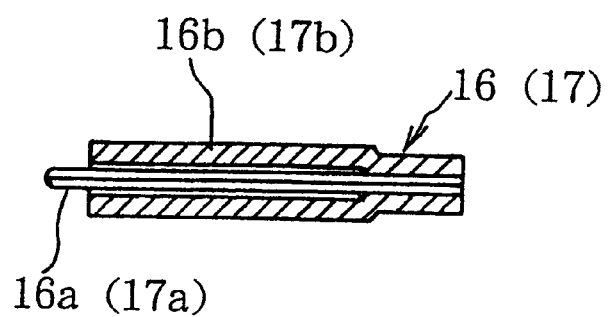
FIG. 5 is an explanatory drawing showing the brush holder for the brush in FIG. 4.

The brushes 16, 17, as shown in FIG. 4 (only one side illustrated for convenience), each comprises a number of brush wires 16a, 17a bent in an L-shape, which are bundled and held by brush holders 16b, 17b (see FIG. 1 for the labels 17a, 17b). The brush holders 16b, 17b are formed as tubes of a conductive metallic material; the base ends of the brush wires 16a, 17a are bundled and inserted in the tubes and held in place with caulk as shown in FIG. 5. The brush holders 16b, 17b hold the brush wires 16a, 17a so that they are in contact with the commutator 15 but so not to overlap one another, and so that the spring ends allow rotation without the base ends slipping out of place.

The brushes 16, 17 are attached to the brush mount 18 by inserting the brush holders 16b, 17b into the brush mount 18 in holes that are parallel to the fixed shaft 10, and fixing them in place. Because of this method of attachment, the spring ends of the brushes 16, 17 contact the commutator at right angles, and by increasing the angle of flexure it is possible to position the brush holders 16b, 17b closer; this enables an assembly that is small but still has a high degree of precision. Further, with regard to the direction of rotation of the commutator 15 which rotates as a unit with the rotor plate 12c, the spring ends make contact both in the forward direction and in the reverse direction, showing spring flexure elasticity on the one hand and torsion elasticity on the other, and thus performing efficient commutation. A flexible lead or other lead wire 19 that connects the brush holders 16b, 17b to a battery or other power source projects from the far side of the brush holder 18.

Figure 6:
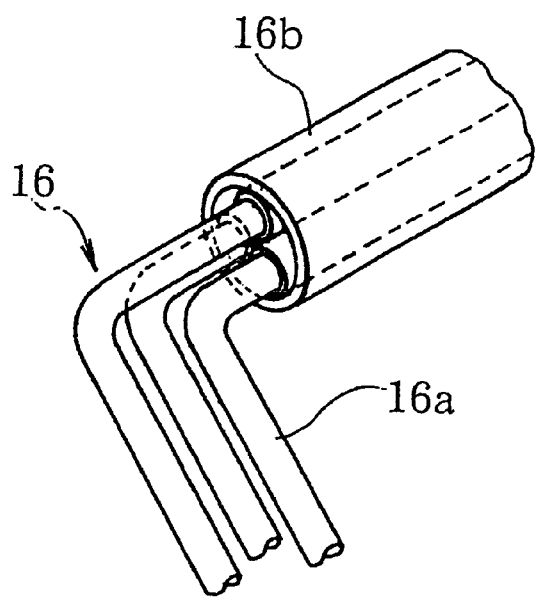
FIG. 6 is an explanatory drawing showing another example of the brushes used in the coreless miniature motor of this invention.
Figure 7:
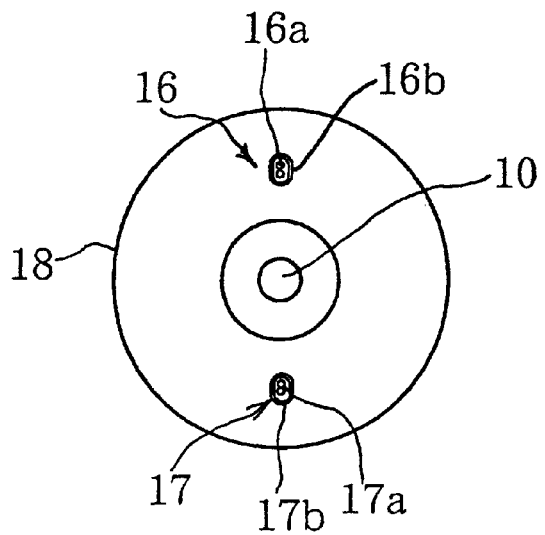
FIG. 7 is a right side view of the coreless miniature motor in FIG. 1.

In place of the brush 16 (17) shown in FIG. 4, it is possible to use the constitution shown in FIG. 6, in which the brush wires 16a (17a) are individually inserted in a hole in the brush holder 16b (17b) and tightened in place. Now, the brushes 16, 17 are positioned such that the brush holders 16b, 17b are on either a vertical or horizontal center line through the axis of the fixed shaft 10, as shown in FIG. 7.

With respect to this brush mount 18, as shown in FIG. 1, the eccentric plate 14 is assembled so as to cover the space in which brushes 16, 17 are located. By this means, the eccentric plate 14 prevents debris from entering the space where the brushes 16, 17 are located.

The brush mount 18 that holds the brushes 16, 17 also serves to hold the fixed shaft 10 in place. Besides the brush mount 18, there is a support plate 20 for the fixed shaft 10 at the other end of the fixed shaft 10.

Figure 8:
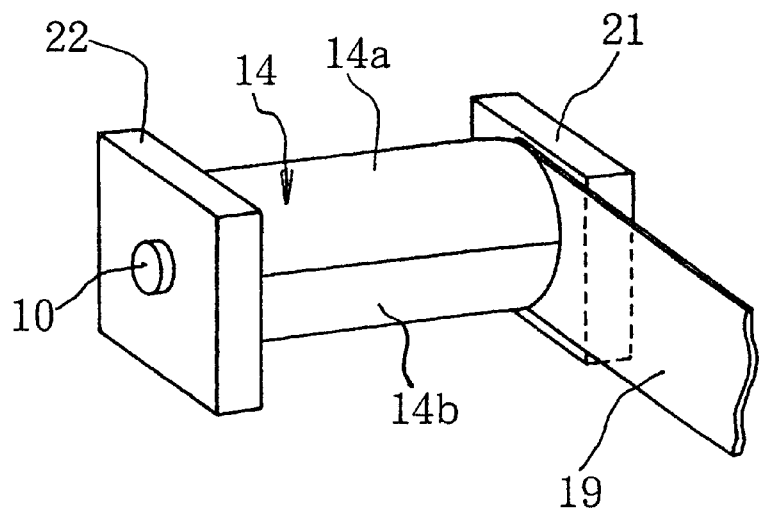
FIG. 8 is a full oblique view showing the coreless miniature motor of this invention with a mounting bracket.
Figure 9:
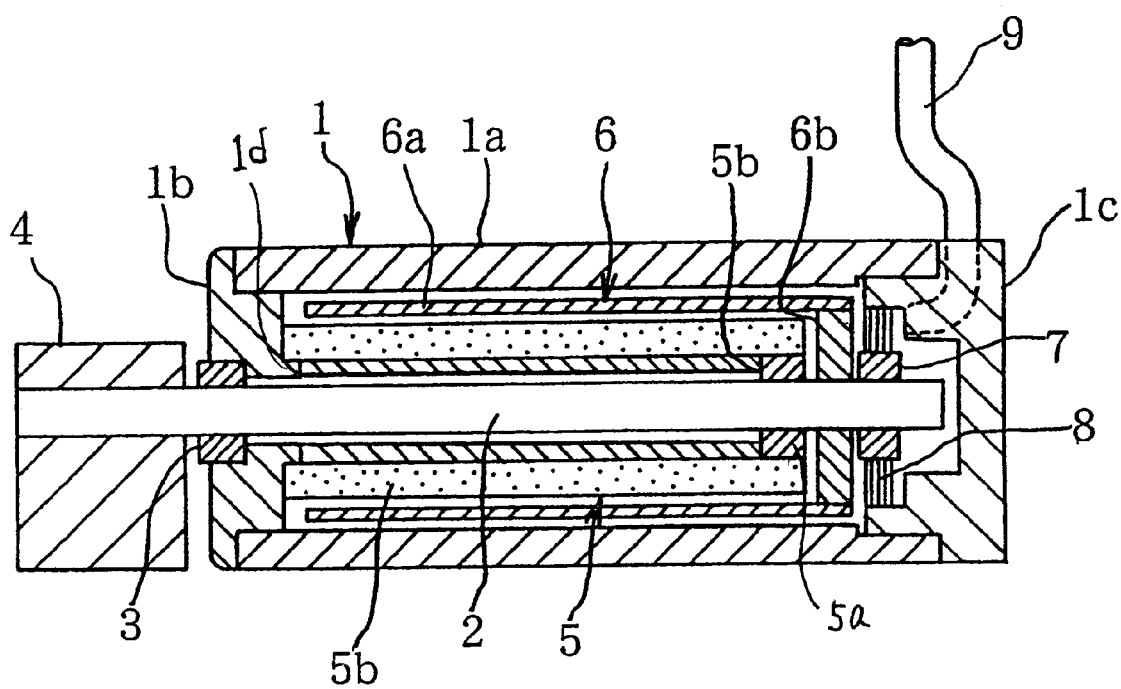
FIG. 9 is a side section showing the internal structure of a conventional coreless miniature motor.

As shown in FIGS. 1 and 8, during assembly the brush mount 18 and the support plate 20 are fitted into fitting brackets 21, 22. These fitting brackets 21, 22 are molded of an elastic material such as rubber or resin, and dampen noise along with supporting the motor. Similarly, they are used for mounting the motor in equipment such as pagers and mobile telephones as a measure to enhance shock resistance when dropped.

The words and expressions used here in describing the particulars of the invention are chosen for convenience in explaining the invention, and do not limit the technical concepts of the invention in any way. In the event that any limiting word or expression has been used, it was not with the intention of excluding anything equivalent to the mode of this invention or part thereof. For that reason, it is clear that it is possible to make a variety of changes within the scope of this invention for which rights have been claimed.

Industrial Utility

As stated above, the coreless miniature motor of this invention is suitable for use as a vibrating alarm device to be incorporated in portable electronic equipment such as pagers and mobiles telephones, or for use as a gyro motor, and particularly for use as a small, light motor.

What is claimed is:

1. A coreless miniature motor with a fixed shaft as the main part, this fixed shaft inserted through and fixed to the center of a field magnet such that the field magnet placed roughly in the middle of the center axis of the fixed shaft to constitute the stator; the outer periphery of the field magnet being encompassed by the inner diameter of a cylindrical coil, separated by a gap, with rotor plates being fitted so as to be free to rotate around the central axis of the fixed shaft on both sides of the field magnet, and these rotor plates being fitted into the ends of the coil with which they constitute the rotor; a cylindrical yoke being placed around the outer periphery of the coil to form a single unit with it, the yoke having an eccentric weight assembled around it; and other parts including a commutator and brushes located around the central axis of the fixed shaft.

2. A coreless miniature motor as described, in claim 1 above, in which a cylindrical yoke formed by a helical wrapping of magnetic wire is placed around the outer periphery of the coil as a single unit with the coil.

3. A coreless miniature motor as described in claims 1 or 2 above, in which a pipe-shaped eccentric plate formed in two parts of a heavy material and a relatively light material is placed around the outer periphery of the yoke as a single unit with the yoke.

4. A coreless miniature motor as described in claim 1 above, in which a brush stand is fitted onto one end of the fixed shaft, such that the base end of the brush is held in the brush stand parallel to the direction of fitting of the fixed shaft, the spring end of the brush is turned perpendicular to the base end, and the brush is in contact with the outer diameter of the commutator.

5. A coreless miniature motor as described in claim 4 above, in which the brush comprises brush wires bent into an L-shape and a brush holder into which the brush wires are tightened after inserting the base end of the brush wires into the brush holder.

6. A coreless miniature motor as described in claims 1, 4 or 5 above, in which the commutator is assembled as a single unit with a rotor plate located close to the brushes.

7. A coreless miniature motor as described in claim 1 above, in which there are fitting brackets, which hold both ends of the fixed shaft, made of an elastic material such as rubber or resin.

* * * * *